United States Patent [19]
Wilson et al.

[11] Patent Number: 5,247,876
[45] Date of Patent: Sep. 28, 1993

[54] DEEP FRYER AND FILTRATION SYSTEM

[76] Inventors: Mark L. Wilson, P.O. Box 7, Pacolet, S.C. 29372; J. Michael Williams, 104 Glasgow Ct., Greenville, S.C. 29607

[21] Appl. No.: 8,153

[22] Filed: Jan. 25, 1993

[51] Int. Cl.$^5$ .............................................. A47J 37/12
[52] U.S. Cl. ......................................... 99/408; 99/330; 99/403; 210/232; 210/257.1; 210/316; 210/416.5; 210/DIG. 8
[58] Field of Search ................. 99/330, 403, 408, 404; 210/232, 257.1, 316, 416.5, 502.1, 679, 805, 437, DIG. 8; 219/437; 126/391

[56] References Cited

U.S. PATENT DOCUMENTS

| | | | |
|---|---|---|---|
| 3,107,601 | 10/1963 | Longmire | 99/330 |
| 3,649,290 | 3/1972 | Angold | 99/408 |
| 3,707,907 | 1/1973 | Wilson et al. | 99/408 |
| 4,328,097 | 5/1982 | Whaley | 210/DIG. 8 |
| 4,444,095 | 4/1984 | Anetsberger et al. | 99/330 |
| 4,622,135 | 11/1986 | Williams | 210/416.5 |
| 4,869,820 | 9/1989 | Yee | 210/316 |
| 4,945,893 | 8/1990 | Manchester | 126/391 |
| 4,949,144 | 9/1990 | Bernard et al. | 210/DIG. 8 |
| 4,974,501 | 12/1990 | Grob et al. | 99/408 |
| 5,167,804 | 12/1992 | Tiggelbeck | 210/257.1 |

FOREIGN PATENT DOCUMENTS

| | | | |
|---|---|---|---|
| 1903748 | 9/1969 | Fed. Rep. of Germany | 99/408 |
| 3135813 | 3/1983 | Fed. Rep. of Germany | 210/316 |
| 8906157 | 7/1989 | PCT Int'l Appl. | 210/257.1 |

Primary Examiner—Timothy F. Simone
Attorney, Agent, or Firm—Cort Flint

[57] ABSTRACT

A deep oil fryer and filtration system is disclosed wherein the filtration system (B) is disposed within a cabinet (16) of a deep oil fryer (A) having a plurality of vats (10, 12, and 14). Filtration system (B) includes a drawer having a reservoir (20) and an adjacent utility compartment (40). A pre-filter (34) is disposed in a filter basket (30) received in reservoir (20) and spaced above a bottom wall of a reservoir by the legs (32). A drain outlet (28) from the reservoir delivers cooking oil to a pump (70). A flow line system which minimizes retention of cooking oil in the lines includes a reservoir outlet line (74), a filter inlet line (78), a filter by-pass line (80), and a return line (86). Whenever by-pass valve (82) is open and pump (70) is on, pre-filtered oil from filter (36) passes through filter inlet (50) and exits filter outlet (64) without passing through a filter element (48) to preheat the filter. The by-passed oil is returned to the cooking vat for rinsing out the cooking vat. When by-pass valve (82) is closed, oil entering filter inlet (50) is forced through filter element (48) on both ends (54a) and (56a). Primary filter (C) is a pressure filter which provides a final filtration of the prefiltered oil. Advantageously, pressure filter (C) includes an end cap (46) which is removable so that filter element (48) may be replaced from an opening in the oil reservoir to obtain any spillage.

31 Claims, 5 Drawing Sheets

DEEP FRYER AND FILTRATION SYSTEM

BACKGROUND OF THE INVENTION

The invention relates to an oil fryer cooking system, and more particularly to a filtration system for an oil fryer which filters the oil in a more convenient and effective manner.

With the advent of fast food restaurants, the art of fast food fryers has seen much development. In order to increase the life of the cooking oil in deep fryer systems, filtration of the oil in a safe and efficient manner is needed. Typically, a fast food restaurant will filter the oil in each vat of the fryer about once a day. The typical deep fryer system in a restaurant will include a plurality of fryer vats. The prior art filter systems typically have included a reservoir in which the oil is drained from a vat. The drain reservoir normally includes a screen or paper filter at the bottom of the reservoir through which the oil is withdrawn from the reservoir and returned to the vat. Typically such a paper filter is good for filtering about 3 vats. In the case of paper or fabric filters, it is difficult to seal the filter around the edges of the reservoir so that some unfiltered oil is able to pass around the edges. Rather than being forced through the filter at a high pressure, the oil is usually drawn through the filter by suction. Prior art deep fryer systems for filters are shown in U.S. Pat. Nos. 4,974,501, 4,444,095, and 4,328,097.

It is also known to use filtered cooking oil for rinsing out the vat, such as disclosed in U.S. Pat. No. 3,707,907 wherein a valve is utilized to close off the return line to the oil vat forcing the filtered cooking oil through a quick release connector to which a rinsing nozzle is connected. The filtered oil passes through the nozzle for rinsing. This assures that all the particles are rinsed from the vat before the vat is refilled with filtered cooking oil. U.S. Pat. No. 4,959,144 discloses the use of a filter to remove larger particles and then a second low pressure filter for removing finer particles. However, the embodiment results in a relatively expensive and complicated construction. Again the filtration provided by the low pressure filter is somewhat limited due to the use of conventional screen and filter pads. There is considerable plumbing in the apparatus which allows for the oil to solidify.

Accordingly, an object of the invention is to provide a filtration unit for a deep oil fryer which provides increased filtration for longer oil life in a simple and reliable manner.

Another object of the invention is to provide a filtration unit for a deep oil fryer which incorporates a pressure filter which is highly effective for filtering the cooking oil and a pre-filter which is utilized to filter the large particles prior to the pressure filter.

Another object of the invention is to provide a deep oil fryer and filtration system having a compact filtration unit, having a by-pass system which allows pre-filtered cooking oil to be used for rinsing the vat but without passing the rinsing oil through the final pressure filter.

Another object of the invention is to provide a highly effective and efficient filtration unit for filtering cooking oil from deep fryers wherein a pressure filter is utilized having a highly efficient filter element which is long lasting, yet easily replaceable when a replacement is needed.

SUMMARY OF THE INVENTION

The above objectives are accomplished according to the present invention by providing a cooking oil filtration system for a deep fryer unit which includes at least one fryer vat with a drain having a valve for opening and closing the drain. The filtration system includes a filter unit having an oil reservoir for containing the cooking oil, and an adjacent filter compartment. A pump is carried in the compartment having a pump motor and the oil reservoir includes a drain outlet connected to the pump for the removal of oil. A primary filter is carried in the compartment having a housing filter inlet connected to the pump. The filter has at least a first outlet. A delivery line delivers oil from the pump to the filter and a by-pass line communicates with the delivery line.

A return line is in fluid communication with the by-pass line for returning oil to the fryer vat. A valve controls the flow of oil in the by-pass and return lines. The valve has a first position in which oil from the delivery line by-passes the filter and is returned to the fryer vat in an unfiltered condition for rinsing the vat. The valve has a second position in which oil from the delivery line passes through the filter and is returned to the fryer vat in a filtered condition. A rinsing nozzle is connected to the return line for rinsing the fryer vat when the valve is in the first position. A pre-filter is carried in the oil reservoir for filtering the oil prior to reaching the pump and the primary filter. The oil is filtered by the pre-filter only when the valve is in the first position and the oil is returned to the vat for rinsing. The pre-filter includes a filter basket having a perforated bottom member, and a sieve filter carried overlying the perforated bottom member. The primary filter includes a filter housing having a filter element carried therein. The housing has a first outlet and a second outlet through which the oil exits the housing. The oil enters the filter housing and passes through the second outlet generally without passing through the filter element for preheating the filter when the valve is in the first position. The oil enters the housing and passes through the filter element and through the first outlet when the valve is in the second position.

Preferably, the primary filter includes a filter housing having a filter element carried therein. The filter housing is carried by a wall of the oil reservoir. The filter housing has a first, open end which opens into the oil reservoir for access to the filter element for replacing the filter element, and a removable end cap for closing the open end of the filter housing. In this manner, any oil spillage in replacing the filter element is contained in the reservoirs. A preheater is carried between the pump and filter for heating the oil prior to reaching the filter to reduce the viscosity of the oil. The filtration unit includes a front panel, and the valve includes a valve handle carried near said front panel and accessible from a front of said fryer cabinet for operating the valve between the first and second positions. A pressure sensor carried in the filter inlet line indicates a high oil pressure in the primary filter, thus indicating the need for changing the removable filter element in the filter.

The filter unit compartment includes a sloped top surface for returning oil spilled on the top surface to the reservoir.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
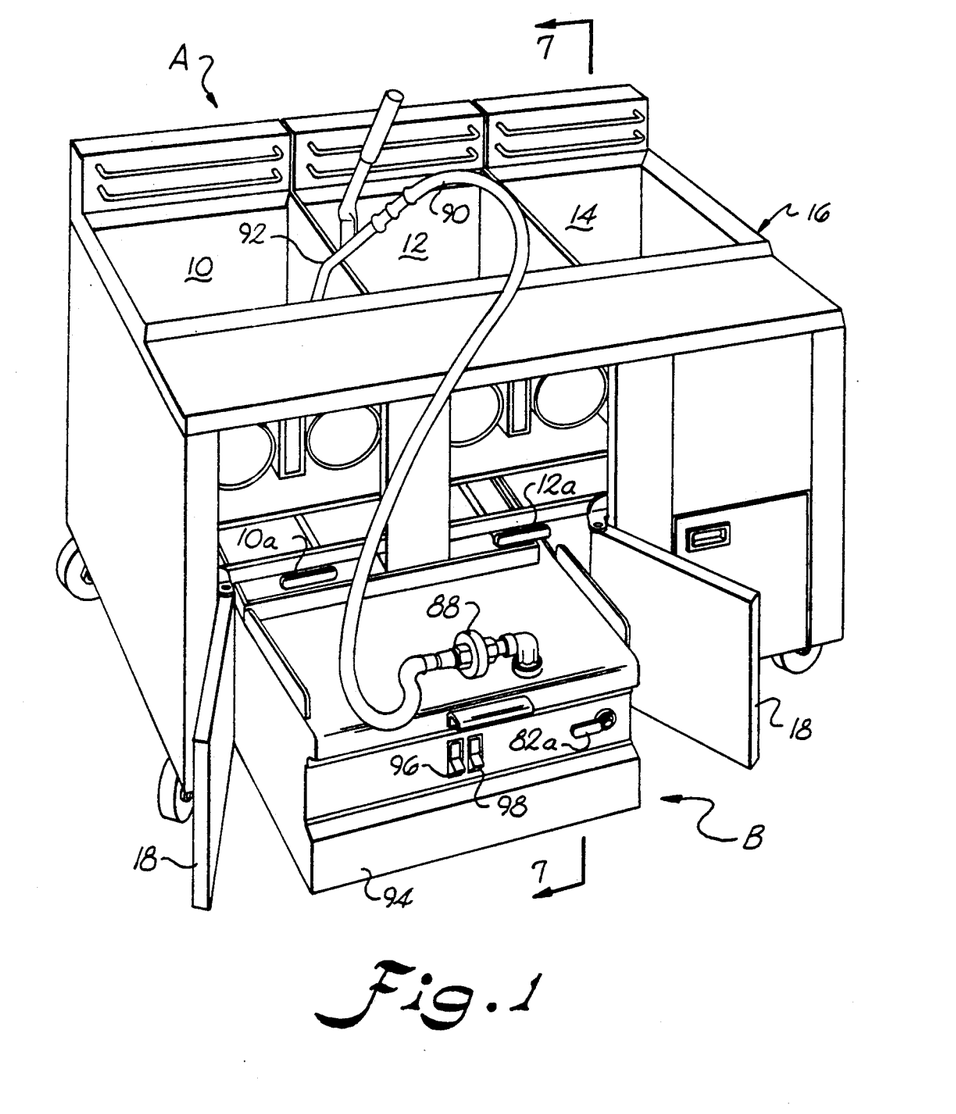
FIG. 1 is a perspective view illustrating a deep fryer and filtration system constructed according to the invention.
Figure 7:
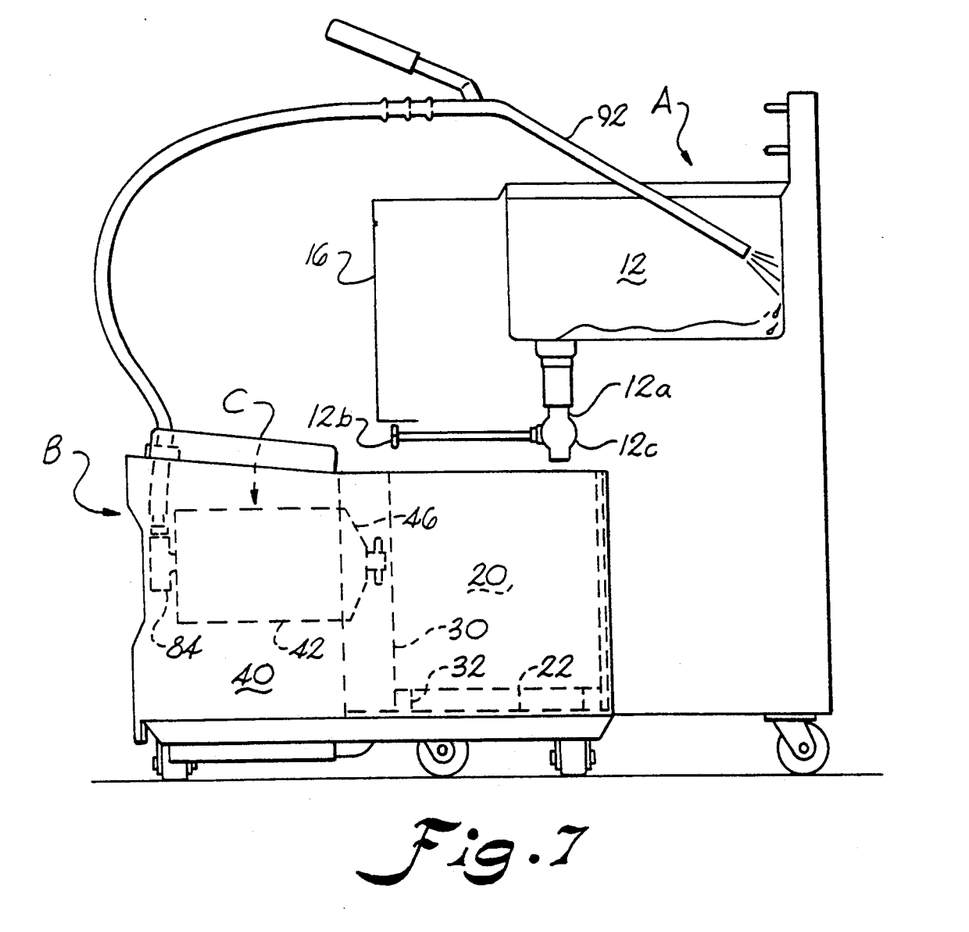
FIG. 7 is an elevation illustrating a side view of a deep fryer and filtration system according to the invention.

Referring now in more detail to the drawings, a deep oil fryer system having a deep fryer unit, designated generally as A, and a filtration unit, designated generally as B, as can best be seen in FIG. 1. Deep fryer unit A includes a plurality of fryer vats 10, 12, and 14. Each vat includes a vat drain, for example, drain 12a shown for vat 12 in FIG. 7. A handle 12b is provided for opening and closing a valve 12c in drain 12a. There is a drain, valve, and valve handle for each vat. The valve handles are accessible from a front of a cabinet 16 which houses the vats and filtration unit B. Typically fryer baskets (not shown) are used in the fryer vats 10 through 14 for frying food. Each vat will be filled with a cooking oil during frying operations.

Figure 2:
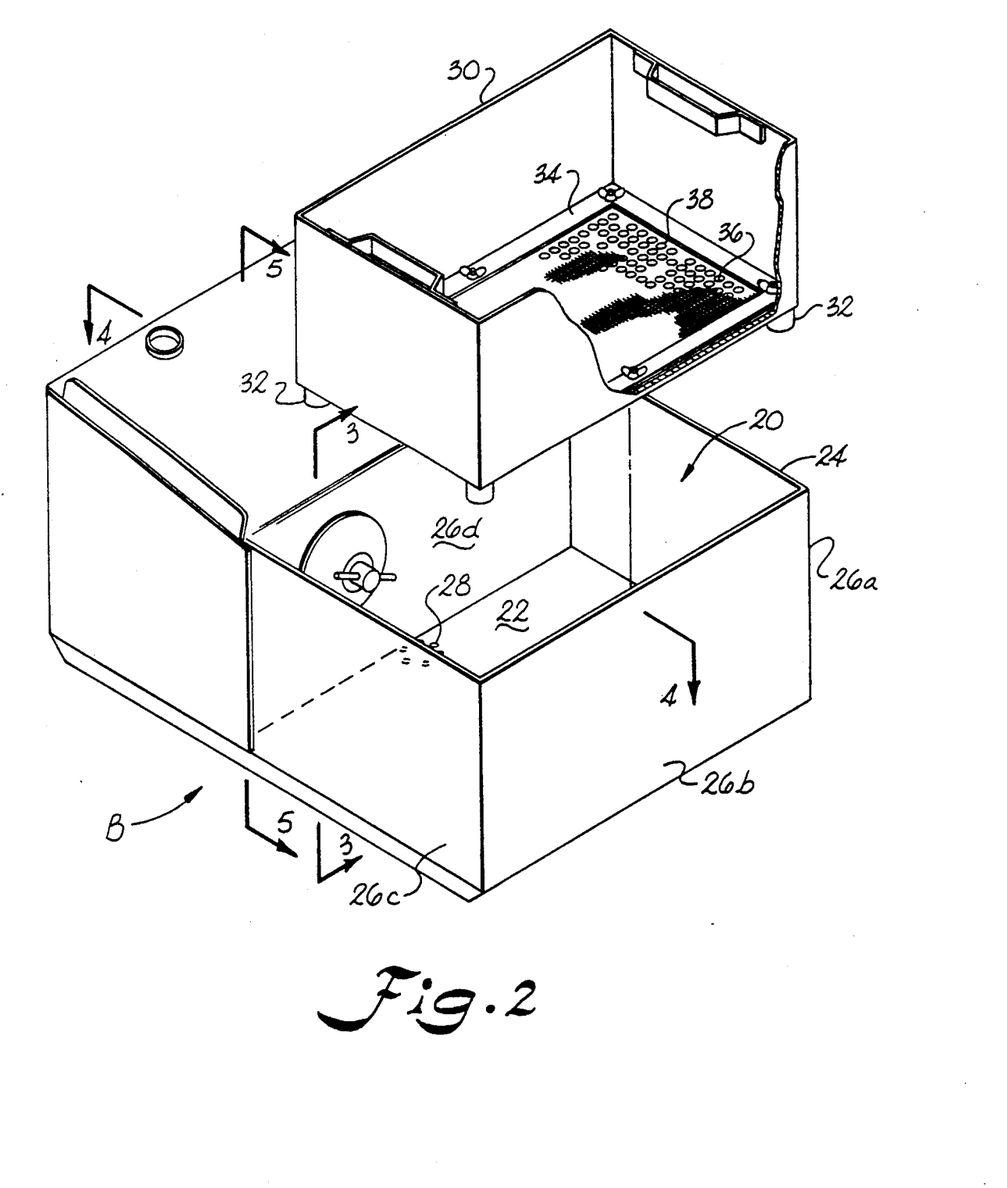
FIG. 2 is a perspective view with parts separated of a filtration unit for a deep fryer system according to the invention.

Filtration unit B is disposed within cabinet 16 through a pair of front entrance doors 18. Preferably, filtration unit B is made to slide or roll in and out of cabinet 16 for access and servicing, as will be more fully explained hereinafter. As can best be seen in FIG. 2, filtration unit B includes an oil reservoir 20 having a bottom floor 22 and a peripheral wall 24. In the illustrated embodiment, oil reservoir 20 is rectangular and the peripheral wall is formed by four side walls 26a through 26d. It is to be understood of course, that the oil reservoir may be provided in other shapes such as cylindrical. An outlet drain 28 is disposed in floor 22 of oil reservoir 20 for the removal of 10 cooking oil. A filter basket 30 is normally received within reservoir 20 and includes a plurality of legs 32 which space the basket a short distance above floor 22 of reservoir 20. Filter basket 30 includes a pre-filter 34 which includes a filter screen in the illustrated embodiment which overlies a bottom plate of filter basket 30 having a plurality of openings 38. Cooking oil passes through the filter media or screen 36 and through the perforated bottom plate to exit through drain outlet 28, as can best be seen in FIG. 6, and which will be more fully explained hereinafter.

Figure 3:
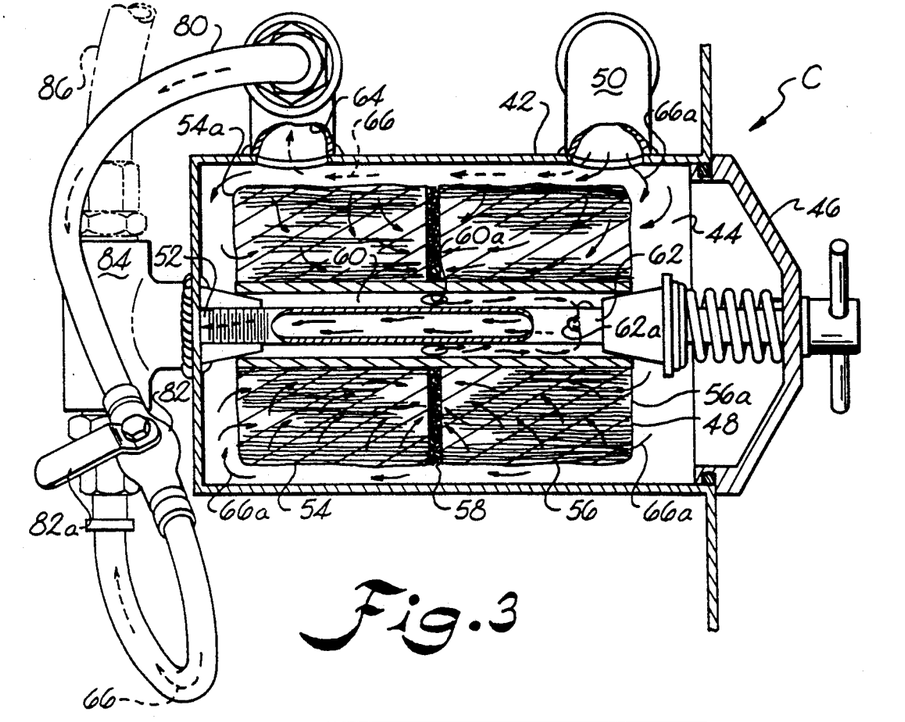
FIG. 3 is a sectional view taken along line 3—3 of FIG. 2.
Figure 4:
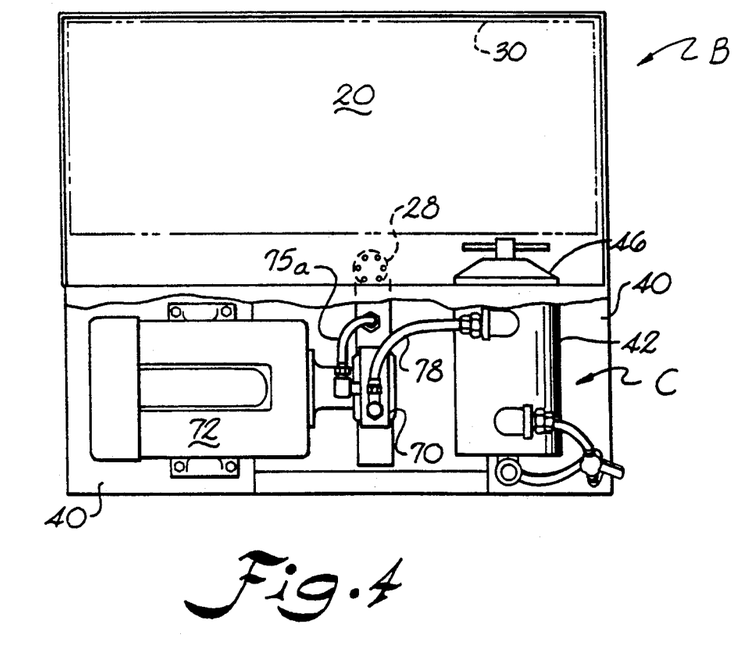
FIG. 4 is a sectional view taken along lines 4—4 of FIG. 2.

As can best be seen in FIGS. 3 and 4, there is a pressure filter C disposed primarily in a compartment 40 adjacent oil reservoir 20. A top 41 of compartment 40 is sloped downwards to reservoir 20 so that oil dripping from a hose coupling and the like may run into reservoir 20. Advantageously, filter C includes a filter housing 42 disposed in compartment 40 which has a first, open end 44 which opens into reservoir 20. Advantageously, a removable end cap 46 provides replacement of the filter element 48 with any residual oil falling into the reservoir 20. This also facilitates removal of the filter element 48 due to the convenient accessibility of the filter through the oil reservoir. Pressure filter C may be any suitable pressure filter which is modified in accordance with the present invention, such as the filter shown in U.S. Pat. No. 4,869,820, incorporated herein by reference. As illustrated, filter C includes an oil inlet 50 and at least a first oil outlet 52. Filter element 48 includes a pair of annular filters 54 and 56 having entrance faces 56a and 54a through which cooking oil enters. The oil is filtered in the annular filters prior to exiting through an annular passage 58 typically filled with a screen mesh for separation of the opposing faces of the filters. The oil then passes through annular passage 58 into a central passage 60 via openings 60a. The oil then passes through outlet 52 by means of a flow tube 62 having ports 62a formed therein. As can best be seen in FIG. 3, in the illustrated embodiment, there is a second, by-pass port 64 provided in the filter housing 42. As will be more fully explained at a later point, cooking oil may enter inlet 50 and bypass filter element 48, as shown by the dotted arrows 66, and leave through bypass outlet 64 without being filtered. As shown in full line arrows 66a, for filtration oil enters inlet 50 and passes through face 56a of filter 56, travel between filter element 48 and the interior walls of filter housing 42. Oil also enters the opposite entrance face 54a of filter 54, and passes through outlet 52 as described above.

Figure 5:
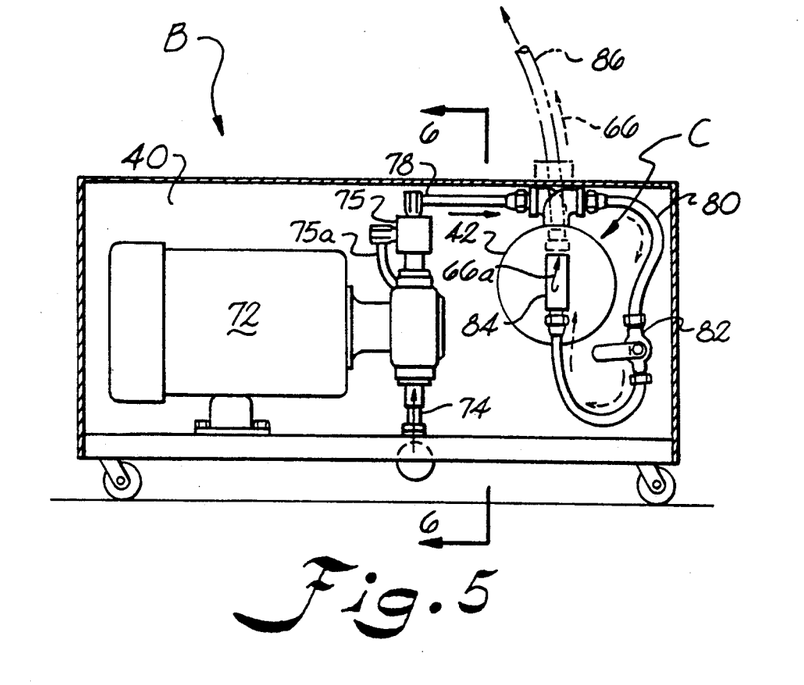
FIG. 5 is a sectional view taken along lines 5—5 of FIG. 2.
Figure 6:
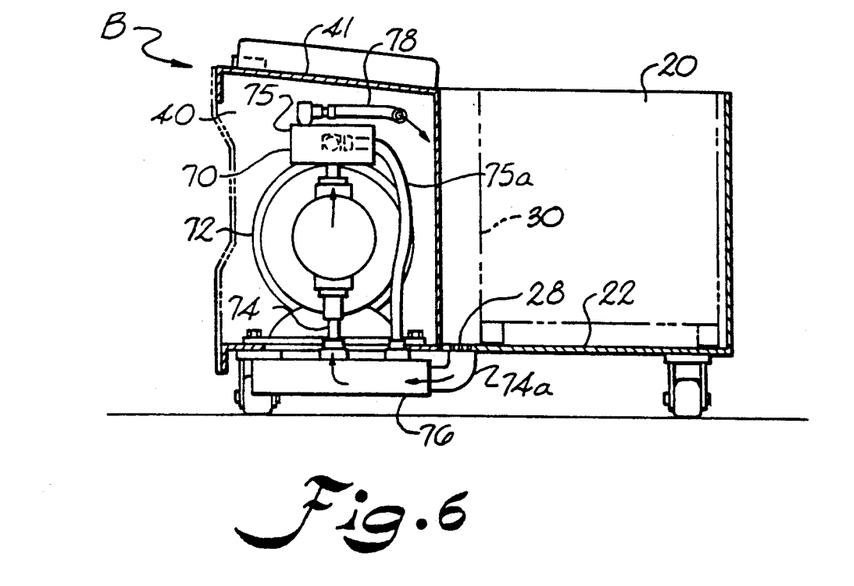
FIG. 6 is an elevation illustrating the end of a filtration unit for a deep fryer system according to the invention.

As can best be seen in FIG. 4 through 6, there is a pump 70 carried in utility compartment 40. There is a delivery line 74 for delivering oil from reservoir 20 to pump 70 which includes an outlet line 74a connected to drain 28. Outlet line 74a lies in a plane below the floor 22 of reservoir 20 and includes an optional preheater 76 which reduces oil viscosity before entering the pump and filter. There is a second delivery line 78 for delivering oil from pump 70 to filter C. Line 78 exits a pressure relief valve 75 having a pressure relief line 75a which by-passes 10 oil in the event oil pressure builds up in filter C. This prevents forcing large particles through the filter. As can best be seen in FIG. 3, there is a bypass line 80 for delivering oil that by-passes the filter to a by-pass valve 82 to a coupling 84 coupled to outlet 52 of the filter. Coupling 84 is illustrated as a tea coupling having a stem connected to flow tube 62, one arm connected to by-pass valve 82, and another arm connected to a return line 86 which returns oil to a fryer vat. Return line 86 may be connected to a quick release coupling 88 for connected to a line 90 terminated at a rinsing nozzle 92. Ultimately, a return line may be provided directly back to each vat with rinsing nozzle 92 being an option. By-pass valve 82 has a handle 82a on a front panel 94 of filtration unit B. A switch 96 may also be provided on the front panel for motor 72 and a switch 98 provided for preheater 76.

Routing the hot oil through filter housing 42, during the by-pass mode preheats the filter and helps liquify any oil remaining in filter element 48 before the filtration mode. A pressure sensor 100 may be placed in filter inlet line 78 to indicate a high filter pressure, e.g. 40-60 psi, a dirty filter, and the need to replace filter element 48.

The operation of the filtration unit will now be described with reference to fryer vat 12. Valve handle 12a is turned to open vat drain 12a so that the cooking oil in vat 12 empties into reservoir 20. Filtration unit B is disposed within cabinet 16 with access to the valves and switches on the front panel. Once the cooking oil has drained into the reservoir, by-pass valve 82 may be moved to a first, open position. Pump motor 96 is then turned on by switch 96. Cooking oil will pass through pre-filter 34, reservoir drain 28, delivery line 74, pump 70, filter inlet 50, filter outlet 64, by-pass line 80, coupling 84, return line 86, flexible coupling hose 90, and nozzle 92 to rinse out the vat as desired. Once the vat is rinsed, pump 70 is cut off and by-pass valve 82 is moved to the second, closed position. The rinsed oil will drain into reservoir 20 during this process. With by-pass valve 82 closed, cooking oil will now be prevented from exiting through by-pass outlet port 64 and will instead be forced through filter element 48, as described previously. After passing through filter element 48, filtered oil will leave through flow tube 62, primary filter outlet 52 and coupling 84 to return line 86 to be returned through the nozzle 92 into vat 12. When by-pass valve 82 is open, pre-filtered oil will enter the filter housing 42 but will not pass through filter element 48 due to the resistance thereof. Alternately, it may be desired to by-pass the filter housing entirely and go from inlet 50 to by-pass line 80, if filter preheating is not needed. Thus, it can be seen as an advantageous construction for a deep oil fryer and filtration system can be had according to the invention, wherein a simple, yet efficient filtering system is provided. High pressure filter C is advantageously incorporated into a filtering apparatus for a deep fryer which provides increased filtering and yet a longer life for the filter element. The filter element of the pressure filter can last three or four times longer than the conventional paper pad filter utilized in the prior deep fryer filtration systems. When it is needed to change the filter element, access may be conveniently had through the oil reservoir. Unwanted oil spillage is avoided since any excess oil enters the reservoir to be reclaimed when the end cap of the filter housing is removed. The angles of the oil flow lines in the system are such that a minimum amount of oil is retained in the line so that solidification problems are reduced considerably. Advantageously, pre-filtered oil is used for rinsing the vat, and use of the pressure filter is avoided prolonging the life of the pressure filter. When the vat is rinsed, both the pre-filter and the pressure filter are utilized for effective filtering of the oil. Since the filter unit is on wheels, it may be removed from cabinet 16 and rolled to other fryer units for quick and easy filtering.

While a preferred embodiment of the invention has been described using specific terms, such description is for illustrative purposes only, and it is to be understood that changes and variations may be made without departing from the spirit or scope of the following claims.

What is claimed is:

1. A cooking oil filtration system for a deep fryer unit which includes at least one fryer vat with a drain having a valve for opening and closing said drain, said filtration system comprising:

a filter unit having an oil reservoir for containing said cooking oil, and an adjacent filter compartment;

a pump carried in said compartment having a pump motor;

said oil reservoir including a drain outlet connected to said pump for the removal of said oil;

a primary filter carried in said compartment having a filter inlet connected to said pump, said filter having at least a first outlet;

a delivery line for delivering oil from said pump to said filter;

a by-pass line in fluid communication with said delivery line;

a return line in fluid communication with said by-pass line for returning said oil to said fryer vat;

a valve for controlling the flow of oil in said by-pass and return lines; and said valve having a first position in which oil from said delivery line by-passes said filter and is returned to said fryer vat in an unfiltered condition for rinsing said vat, and said valve having a second position in which oil from said delivery line passes through said filter and is returned to said fryer vat in a filtered condition.

2. The system of claim 1 including a rinsing nozzle connected to said return line for rinsing said fryer vat when said valve is in said first position.

3. The system of claim 1 including a pre-filter carried in said oil reservoir for filtering said oil prior to reaching said pump and said primary filter, and said oil being filtered by said pre-filter only when said valve is in said first position and said oil is returned to said vat for rising.

4. The system of claim 3 wherein said pre-filter includes a filter basket having a perforated bottom member, and a sieve filter carried overlying said perforated bottom member.

5. The system of claim 1 wherein said filter includes a filter housing having a filter element carried therein, said housing having said first outlet and a second outlet through which said oil leaves said housing.

6. The system of claim 5 wherein said oil enters said filter housing and passes through said second outlet generally without passing through said filter element for preheating said filter when said valve is in said first position, and said oil enters said housing and passes through said filter element and through said first outlet when said valve is in said second position.

7. The system of claim 1 wherein said filter includes a filter housing having a filter element carried therein, said filter housing being carried by a wall of said oil reservoir, said filter housing has a first, open end which opens into said oil reservoir for access to said filter element for replacing said filter element, and a removable end cap for closing said open end of said filter housing.

8. The system of claim 1 including a pressure sensor for indicating a high oil pressure in said primary filter and the need for changing a removable filter element in said filter.

9. The system of claim 1 including a preheater carried between said pump and said filter for heating said oil prior to reaching said filter to reduce the viscosity of said oil.

10. A deep fryer system having a fryer unit which includes a fryer cabinet having at least one fryer vat with a drain for removing oil from said fryer vat for filtration, and a filtration unit disposed in said cabinet for filtering cooking oil in said fryer vat, wherein said system comprises:
- said filtration unit having an oil reservoir for receiving cooking oil from said vat drain and containing said cooking oil, said oil reservoir having a peripheral reservoir wall and a bottom floor;
- a pump carried in a compartment of said fryer unit adjacent said oil reservoir having a pump motor;
- said oil reservoir including a reservoir outlet in said bottom floor of said oil reservoir connected to said pump for the removal of said oil;
- an outlet line carried at least in part below a plane of said bottom floor of said oil reservoir for delivering oil from said reservoir outlet to said pump;
- a primary filter carried in said compartment having a filter inlet connected to said pump, said filter having at least a first outlet;
- a delivery line for delivering oil from said pump to said filter; and
- a return line in fluid communication with said primary filter for returning said oil to said fryer vat.

11. The system of claim 10 including:
- a by-pass line in fluid communication with said delivery line;
- a valve for controlling the flow of oil in said by-pass and return lines; and
- said valve having a first position in which oil from said delivery line by-passes said filter and is returned to said fryer vat in an unfiltered condition for rinsing said vat, and said valve having a second position in which oil from said delivery line passes through said filter and is returned to said fryer vat in a filtered condition.

12. The system of claim 11 including a rinsing nozzle connected to said return line for rinsing said fryer vat when said valve is in said first position.

13. The system of claim 11 including a pre-filter carried in said oil reservoir for filtering said oil prior to reaching said pump and said primary filter, and said oil being filtered by said pre-filter only when said valve is in said firs position and said oil is returned to said vat for rising.

14. The system of claim 13 wherein said pre-filter includes a filter basket having a perforated bottom member, and a sieve filter carried overlying said perforated bottom member.

15. The system of claim 11 wherein said primary filter includes a filter housing having a filter element carried therein, said housing having said first outlet and a second outlet through which said oil leaves said housing.

16. The system of claim 15 wherein said oil enters said filter housing and passes through said second outlet generally without passing through said filter element when said valve is in said first position, and said oil enters said housing and passes through said filter element and through said first outlet when said valve is in said second position.

17. The system of claim 11 wherein said filter includes a filter housing having a filter element carried therein, said filter housing being carried by a wall of said oil reservoir, said filter housing has a first, open end which opens into said oil reservoir for access to said filter element for replacing said filter element, and a removable end cap for closing said open end of said filter housing.

18. The system of claim 10 including a pressure sensor for indicating a high oil pressure in said primary filter and the need for changing a removable filter element in said filter.

19. The system of claim 11 wherein said filtration unit includes a front panel, said valve includes a valve handle carried near said front panel and accessible from a front of said fryer cabinet for operating said valve between said first and second positions.

20. The system of claim 10 wherein said compartment includes a sloped top surface for returning oil spilled on said top surface to said reservoir.

21. A cooking oil filtration system for a deep fryer unit which includes at least one fryer vat with a drain for removing oil from said fryer vat for filtration comprising:
- a filtration unit having an oil reservoir for receiving cooking oil from said vat drain and containing said cooking oil, said oil reservoir having a peripheral reservoir wall and a bottom floor;
- a pump carried in a compartment of said fryer unit adjacent said oil reservoir having a pump motor;
- said oil reservoir including a reservoir outlet connected to said pump for the removal of said oil;
- an outlet line for delivering oil from said reservoir outlet to said pump;
- a primary filter carried in said compartment having a filter inlet connected to said pump, said filter having at least a first outlet;
- a delivery line for delivering oil from said pump to said filter;
- a return line in fluid communication with said primary filter for returning said oil to said fryer vat; and
- said filter includes a filter housing having a filter element carried therein, said filter housing being carried by a wall of said oil reservoir, said filter housing has a first, open end which opens into said oil reservoir for access to said filter element for replacing said filter element so that residual oil in said filter housing is contained in said oil reservoir when said first end is open, and a removable end cap for closing said open end of said filter housing.

22. The system of claim 21 including:
- a by-pass line in fluid communication with said delivery line;
- a valve for controlling the flow of oil in said by-pass and return lines; and
- said valve having a first position in which oil from said delivery line by-passes said filter and is returned to said fryer vat in an unfiltered condition for rinsing said vat, and said valve having a second position in which oil from said delivery line passes through said filter and is returned to said fryer vat in a final filtered condition.

23. The system of claim 22 including a rinsing nozzle connected to said return line for rinsing said fryer vat when said valve is in said first position.

24. The system of claim 22 including a pre-filter carried in said oil reservoir for filtering said oil prior to reaching said pump and said primary filter, and said oil being filtered by said pre-filter only when said valve is in said first position and said oil is returned to said vat for rising.

25. The system of claim 24 wherein said pre-filter includes a filter basket having a perforated bottom member, and a sieve filter carried overlying said perforated bottom member.

26. The system of claim 22 wherein said primary filter includes a filter housing having a filter element carried therein, said housing having said first outlet and a second outlet through which said oil leaves said housing.

27. The system of claim 26 wherein said oil enters said filter housing and passes through said second outlet generally without passing through said filter element when said valve is in said first position, and said oil enters said housing and passes through said filter element and through said first outlet when said valve is in said second position.

28. The system of claim 22 including a preheater carried between said reservoir outlet and said pump for heating said oil prior to reaching said filter to reduce the viscosity of said oil.

29. The system of claim 22 wherein said reservoir outlet in is disposed in said bottom floor of said oil reservoir; and said outlet line is disposed at least in part below a plane of said bottom floor of said oil reservoir for delivering oil from said reservoir outlet to said pump.

30. The system of claim 21 including a pressure sensor for indicating a high oil pressure in said primary filter and the need for changing a removable filter element in said filter.

31. The system of claim 21 wherein said compartment includes a sloped top surface for returning oil spilled on said top surface to said reservoir.

* * * * *